(12) United States Patent
McGeough

(10) Patent No.: US 8,770,423 B2
(45) Date of Patent: Jul. 8, 2014

(54) CONTAINER CLOSURE WITH MEASURING SPOON

(75) Inventor: Peter Michael McGeough, Kells (IE)

(73) Assignee: Bapco Closures Research Ltd., Surrey (GB)

( * ) Notice: Subject to any disclaimer, the term of this patent is extended or adjusted under 35 U.S.C. 154(b) by 2 days.

(21) Appl. No.: 13/511,043

(22) PCT Filed: Nov. 29, 2010

(86) PCT No.: PCT/GB2010/051985
§ 371 (c)(1),
(2), (4) Date: May 21, 2012

(87) PCT Pub. No.: WO2011/067585
PCT Pub. Date: Jun. 9, 2011

(65) Prior Publication Data
US 2012/0279964 A1    Nov. 8, 2012

(30) Foreign Application Priority Data
Dec. 3, 2009    (GB) .................................. 0921192.1

(51) Int. Cl.
*B65D 51/24*    (2006.01)
(52) U.S. Cl.
USPC ............................ 220/212; 220/735; 220/270
(58) Field of Classification Search
USPC .......... 220/212, 735, 574 A, 574.1, 276, 270, 220/269, 266, 258.8, 254.1
See application file for complete search history.

(56) References Cited

U.S. PATENT DOCUMENTS

| 3,955,742 | A | * | 5/1976 | Marshall et al. ............... 220/574 |
| 5,054,642 | A | * | 10/1991 | Yoshida ......................... 220/276 |
| 5,125,528 | A | * | 6/1992 | Heyn et al. ..................... 220/269 |
| 5,443,174 | A | | 8/1995 | Bauer |
| 5,775,531 | A | * | 7/1998 | Lowry ......................... 220/212.5 |
| 5,992,667 | A | | 11/1999 | Huang |
| 6,604,645 | B1 | | 8/2003 | Vaupotic |
| 7,040,500 | B2 | * | 5/2006 | Kipperman et al. ........ 220/574.1 |
| 7,175,041 | B2 | * | 2/2007 | Ekkert .......................... 220/212 |
| 7,971,747 | B2 | * | 7/2011 | Blomdahl et al. ............. 220/735 |
| 8,042,704 | B2 | * | 10/2011 | Borowski et al. ........... 220/574.1 |
| 8,469,223 | B2 | * | 6/2013 | Perry et al. ..................... 220/608 |
| 2001/0035424 | A1 | * | 11/2001 | Combe et al. ................. 220/835 |
| 2006/0156811 | A1 | | 7/2006 | Borowski et al. |

(Continued)

FOREIGN PATENT DOCUMENTS

| CN | 1303347 A | 7/2001 |
| CN | 1504392 A | 6/2004 |

(Continued)

OTHER PUBLICATIONS

International Search Report and Written Opinion for PCT/GB2010/051985, mailed on Feb. 23, 2011, 8 pages.

*Primary Examiner* — Steven A. Reynolds
(74) *Attorney, Agent, or Firm* — K&L Gates LLP

(57) ABSTRACT

A closure for a container has an integral measuring spoon (40). A spout (10) is adapted to fit over a mouth of a container (4) and is induction heat sealed to the rim by a foil (6). The foil is torn by removing a removable strip (20) that also provides a frame to support the spoon. One corner (32) of the spout can be raised to provide a holder for the spoon after the closure has been opened.

1 Claim, 6 Drawing Sheets

(56) References Cited

U.S. PATENT DOCUMENTS

| | | |
|---|---|---|
| 2008/0156806 A1 | 7/2008 | Perry et al. |
| 2008/0156808 A1* | 7/2008 | Perry et al. ............... 220/560.03 |
| 2009/0184120 A1* | 7/2009 | Stevens ...................... 220/212.5 |
| 2010/0051631 A1* | 3/2010 | Blomdahl et al. ............ 220/735 |

FOREIGN PATENT DOCUMENTS

| | | |
|---|---|---|
| CN | 1696022 A | 11/2005 |
| DE | 10252499 A1 | 5/2004 |
| FR | 2915969 A1 | 11/2008 |
| GB | 2250271 A | 6/1992 |
| GB | 2381785 A | 5/2003 |
| JP | 2007-99287 A | 4/2007 |
| WO | 99/61336 A2 | 12/1999 |
| WO | 99/61337 | 12/1999 |
| WO | 2005/016779 A1 | 2/2005 |
| WO | 2005/075314 A2 | 8/2005 |
| WO | 2010/027398 A1 | 3/2010 |
| WO | 2013/043219 A1 | 3/2013 |

\* cited by examiner

CONTAINER CLOSURE WITH MEASURING SPOON

CROSS REFERENCE TO RELATED APPLICATIONS

This is the national stage under 35 U.S.C. §371 of International Application No. PCT/GB2010/051985, filed on Nov. 29, 2010, which claims priority to and the benefit of GB Patent Application No. 0921192.1, filed on Dec. 3, 2009, the entire disclosures of each of which are incorporated by reference herein.

TECHNICAL FIELD

The present invention relates to container closures and more specifically to a container closure provided with a measuring spoon for removing the contents from the container.

Many products, for example baby milk powder, require the use of an accurate measure. It is standard practice to provide a measuring spoon in the container. Often the spoon is placed in the container along with the contents. Where the container is filled from its base, this means that the spoon placed on top of the contents after the container has been filled is at the bottom of the package when the consumer opens the container. This requires that the consumer fumble amongst the contents of the container to extract the measuring spoon.

In order to provide security that the contents of such containers have not been tampered with and to ensure freshness of the contents, the mouth of the container is frequently sealed by means of a pealable foil over the mouth of the container.

When containers are foil sealed, it has been proposed to secure a spoon on the inside of the foil. DE 10252499 A (LASKOWSKI SIGISMUND) May 27, 2004 is one example. This requires a complex assembly process. In another proposal GB 2381785 A (YEW TREE CONSULTANTS LTD) May 14, 2003, the spoon is provided on the exterior of the container and is integrally moulded with the lid.

Disclosure of Invention

The present invention addresses the technical problem of providing a measuring spoon integral with a container closure in such a manner that the spoon is readily accessible to the consumer and remains clean and protected.

The present invention uses a closure as described in EP 1656306 A (BAPCO CLOSURES RESEARCH LTD) May 17, 2006, the disclosure of which is incorporated herein by reference.

The present invention provides a closure comprising a spout adapted to fit over a mouth of a container defined by a rim; an induction heat sealing foil; the spout having a base adapted to be secured to the rim of a container by means of the foil which is pre-sealed to the base prior to attachment to the container mouth; and a removable part connected to the base by means of a frangible region and pre-sealed to the induction heat sealing foil; characterised in that the removable part defines a frame portion with a measuring spoon integrally moulded with the spout and connected to the removable part by means of frangible bridges to enable the spoon to be removed prior to opening of the container.

Preferably the base of the spout defines a raised portion adapted to act as a spoon holder.

In a preferred embodiment, the base is rectangular and the raised portion is defined by a diagonal boundary which cuts off one corner of the rectangle.

The solution of the invention has numerous advantages. As well as making the spoon immediately accessible to the consumer, the change from a heavyweight pealable foil to a lighter tearable foil saves weight and materials. By providing the base with a three-dimensional structure, it has added structural rigidity and can be made thinner reducing the overall weight of the package. Because the spoon is integrally moulded with the spout, there is no separate assembly needed during the packaging of the containers.

BRIEF DESCRIPTION OF DRAWINGS

In order that the invention may be well understood, an embodiment thereof will now be described, by way of example only, with reference to the accompanying diagrammatic drawings, in which.

MODE(S) FOR CARRYING OUT THE INVENTION

Figure 1:
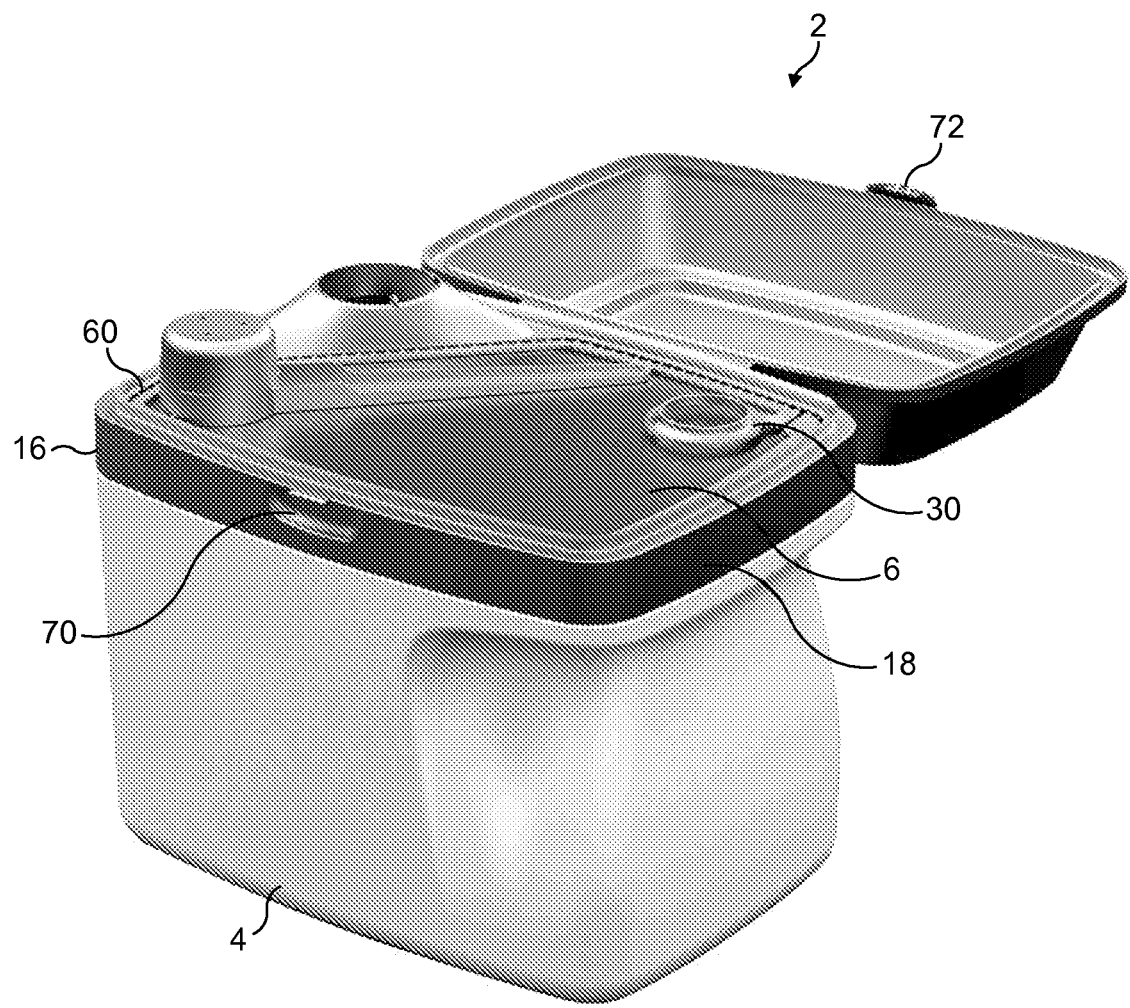
FIG. 1 is a perspective view of a container with a closure in accordance with the invention fitted and having an open lid showing the spout with integral measuring spoon in a sealed condition prior to use.

The closure 2 is intended to be fitted to a wide mouthed open top container 4 as shown in FIG. 1. The closure is sealed to a rim of the container by means of an induction heat sealing foil 6 which has a coating of a compatible plastics material adhered to each surface of the foil so that it can be welded both to a rim of the container and to the closure in the manner described in EP 1656306 A (BAPCO CLOSURES RESEARCH LTD) May 17, 2006.

Figure 2:
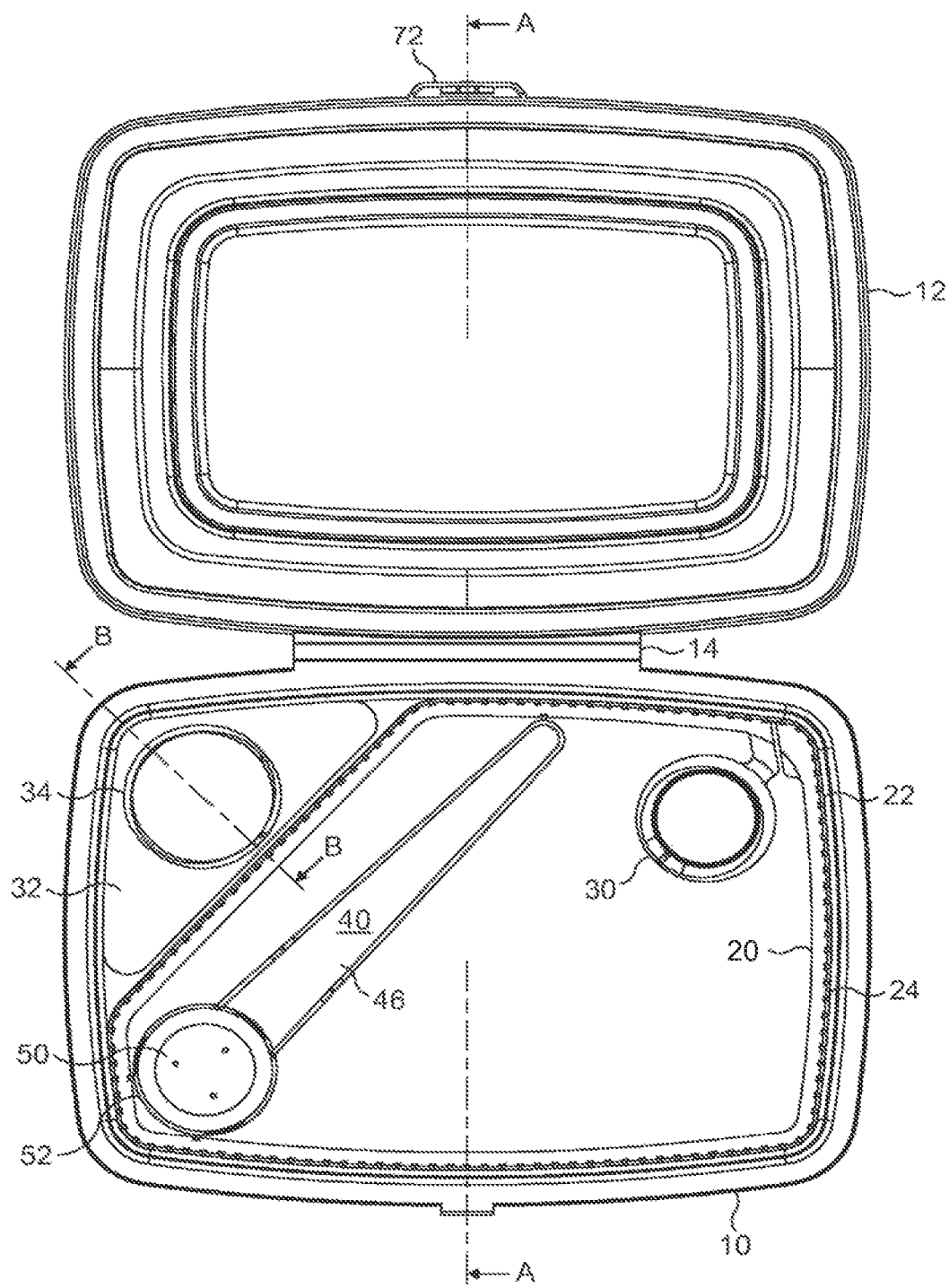
FIG. 2 is a plan view of the closure of FIG. 1 from above.
Figure 3:
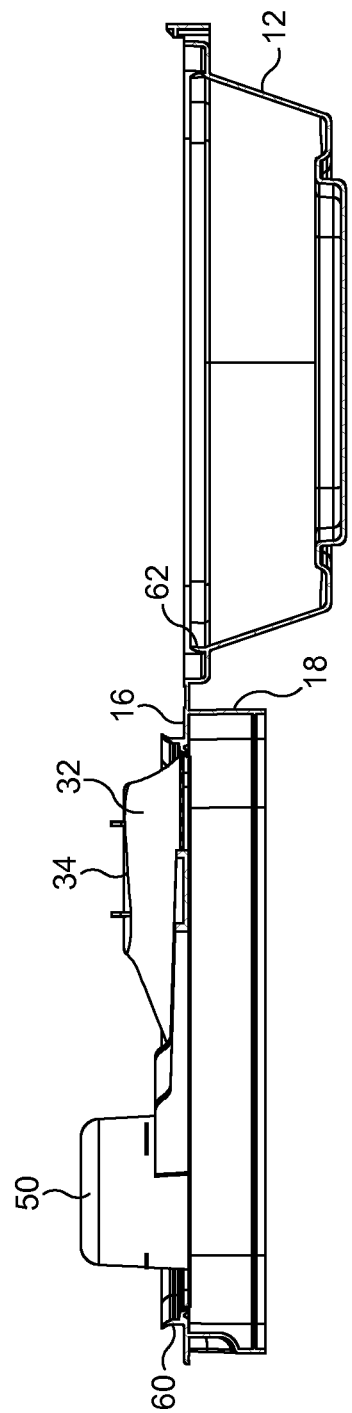
FIG. 3 is a sectional view on line A-A in FIG. 2.
Figure 4:
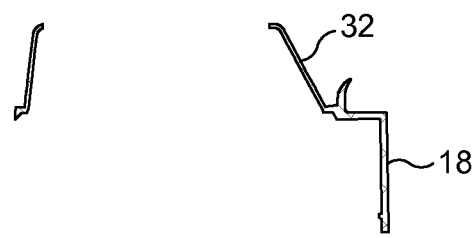
FIG. 4 is a sectional view on line B-B in FIG. 2.
Figure 6:
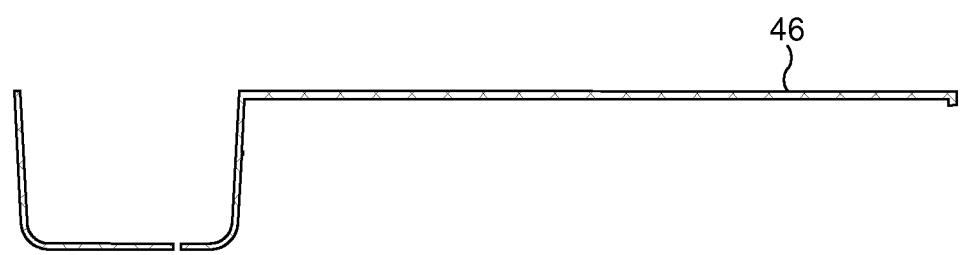
FIG. 6 is a sectional view on line C-C in FIG. 5 showing the profile of the measuring spoon.
Figure 5:
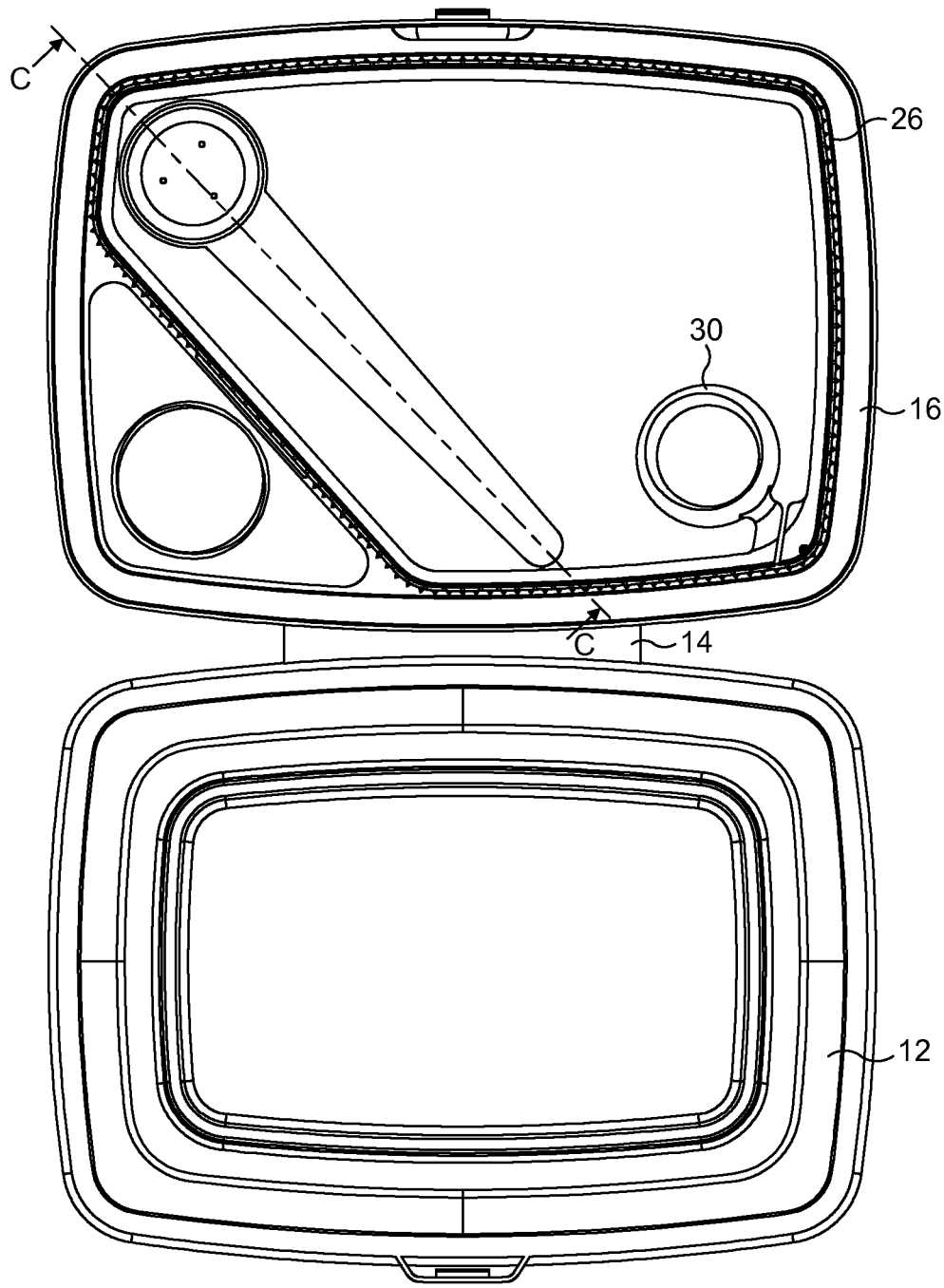
FIG. 5 is a plan view of the closure of FIG. 1 from below.

The closure 2 is an injection moulded plastics component that can be moulded in one piece in the open condition as shown in FIGS. 2 and 5. The closure has a spout 10 and a lid 12 which is hinged to the spout by means of a plastics web that creates a live hinge 14.

The spout 10 has a base 16 in the form of a flat flange with a depending skirt 18 which locates over the mouth of the container. A removable portion of the spout is a strip 20 that defines a frame extending around the inside of the base flange and connected to the base by means of a frangible region 22 that is spanned by a series of bridges 24. On an underside of the base flange 16 as seen in FIG. 5 a series of teeth 26 are moulded. A pull ring 30 is connected to one end of the strip 20 and is moulded in a slightly elevated position relative to the base flange 16.

Across one corner of the base a triangular section 32 of the base flange is raised out of the plane of the base flange 16. A circular opening 34 is formed in this corner.

A measuring spoon 40 is integrally moulded with the spout. A handle 46 of the spoon lies roughly parallel to a diagonal boundary of the raised corner portion 32. An end of the handle is connected by means of a frangible bridge 48 to the removable strip 20. At the opposite end of the handle 46 a bowl 50 is formed and this, too, is connected to the strip 20 by means of bridges 52. The bowl is sized to define an appropriate measure for the contents of the container. its diameter is such that the spoon bowl can be seated into the opening 34 so that the raised corner can act as a holder for the spoon after it has been detached from the spout. The spoon is shown in its storage position in FIG. 7.

A raised sealing lip 60 is moulded around the periphery of the base outwardly of the frangible region 22.

Figure 7:
FIG. 7 is an open view of the closure after the container has been opened with the measuring spoon in the spoon holder.

The lid 12 is domed so that it can be closed over the spout and integral measuring spoon both when the spoon is in the initial position as shown in FIG. 1 and in the stored position as shown in FIG. 7. The lid 12 is provided with a depending valve 62 which sealingly engages with the lip 60 on the spout. A latching formation 70 on the skirt 18 corporate with a sealing tab 72 formed on the lid 12 in order to enable the lid to be latched into a closed condition.

The closure 2 is sealed to the container by means of the induction heat sealing foil 6. The foil 6 is exposed through a central gap in the frame of the removable portion as can be seen in FIG. 1. Prior to fitting the closure to the container, the foil is induction heat sealed to both the under surface of the base flange 16 and to the strip 20. Since the edge of the foil is retained underneath the spout once the closure has been fitted to the container, it is necessary to tear the foil in order to gain entry into the container. This is achieved by pulling on the pull ring 30 which initiates a tear just underneath the mounting of the pull ring 30. The strip 20 is then torn out along with the foil. The presence of the raised corner 32 supports the spout as the foil is being ripped diagonally away from the mouth of the container.

The pre-foiled closures can be supplied to the filling plant in the flat condition shown in FIG. 2. Once the closure has been welded to the mouth of the container the lid can be closed and latched to the base of the spout for delivery.

On opening the lid 12, the consumer has immediate access to the measuring spoon 40 which can be removed prior to opening of the container. Alternatively the consumer may pull off the foil complete with the measuring spoon and detach the spoon afterwards.

The invention claimed is:

1. A plastic closure for a container having an open mouth with a rim comprising:
   a spout adapted to fit over the mouth of the container;
   a lid adapted to close over the spout;
   an induction heat sealing foil;
   the spout having:
      a rectangular base adapted to be secured to the rim of the container by means of the foil which is pre-sealed to the base prior to attachment to the container mouth, wherein the base of the spout has a diagonal boundary which cuts off one corner of the rectangle, that corner having a raised portion adapted to act as a spoon holder;
      a removable frame portion connected to the base by means of a frangible region and pre-sealed to the induction heat sealing foil;
      a ring pull moulded to the frame portion; and
      a measuring spoon integrally moulded with the spout and connected to the removable portion by means of discrete frangible bridges to enable the spoon to be removed prior to opening of the container.

* * * * *